(12) United States Patent
Luong et al.

(10) Patent No.: US 7,500,123 B2
(45) Date of Patent: Mar. 3, 2009

(54) APPARATUS AND METHOD FOR REDUCING POWER CONSUMPTION IN A GRAPHICS PROCESSING DEVICE

(75) Inventors: Tien D. Luong, Thornhill (CA); Erwin Pang, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 610 days.

(21) Appl. No.: 10/878,466

(22) Filed: Jun. 28, 2004

(65) Prior Publication Data

US 2005/0289377 A1 Dec. 29, 2005

(51) Int. Cl.
*G06F 1/26* (2006.01)
(52) U.S. Cl. .................. 713/322; 713/320; 713/323
(58) Field of Classification Search .......... 713/300, 713/320, 322
See application file for complete search history.

(56) References Cited

U.S. PATENT DOCUMENTS

| | | | |
|---|---|---|---|
| 5,544,101 A | 8/1996 | Houston | |
| 5,675,808 A | 10/1997 | Gulick et al. | |
| 5,752,045 A | 5/1998 | Chen | |
| 5,781,496 A | 7/1998 | Pinkham et al. | |
| 5,781,768 A | 7/1998 | Jones, Jr. | |
| 5,804,749 A | 9/1998 | Shirakawa et al. | |
| 5,835,435 A | 11/1998 | Bogin et al. | |
| 5,907,330 A | 5/1999 | Simmers | |
| 6,067,083 A | 5/2000 | Glen et al. | |
| 6,073,223 A | 6/2000 | McAllister et al. | |
| 6,079,024 A * | 6/2000 | Hadjimohammadi et al. | 713/322 |
| 6,079,025 A | 6/2000 | Fung | |
| 6,112,310 A | 8/2000 | Jun et al. | |
| 6,177,946 B1 | 1/2001 | Sinclair et al. | |
| 6,192,479 B1 * | 2/2001 | Ko | 713/300 |
| 6,209,075 B1 | 3/2001 | Lau | |
| 6,256,743 B1 | 7/2001 | Lin | |
| 6,263,448 B1 | 7/2001 | Tsern et al. | |
| 6,292,201 B1 | 9/2001 | Chen et al. | |
| 6,298,448 B1 * | 10/2001 | Shaffer et al. | 712/322 |
| 6,307,281 B1 | 10/2001 | Houston | |
| 6,342,795 B1 * | 1/2002 | Ohta | 327/99 |
| 6,460,125 B2 | 10/2002 | Lee et al. | |
| 6,657,634 B1 | 12/2003 | Sinclair et al. | |
| 6,820,209 B1 * | 11/2004 | Culbert et al. | 713/501 |
| 6,848,058 B1 | 1/2005 | Sinclair et al. | |
| 6,983,389 B1 * | 1/2006 | Filippo | 713/324 |
| 2001/0014924 A1 * | 8/2001 | Nishihara | 710/52 |
| 2002/0169990 A1 * | 11/2002 | Sherburne, Jr. | 713/300 |
| 2003/0110406 A1 * | 6/2003 | Takada | 713/320 |
| 2003/0141901 A1 * | 7/2003 | Schulz | 326/93 |
| 2004/0139361 A1 * | 7/2004 | Flynn | 713/320 |
| 2005/0086553 A1 * | 4/2005 | Spencer | 713/600 |
| 2005/0195181 A1 * | 9/2005 | Khodorkovsky | 345/211 |

* cited by examiner

*Primary Examiner*—Chun Cao
(74) *Attorney, Agent, or Firm*—Vedder Price P.C.

(57) ABSTRACT

Briefly, the present invention includes a method and an apparatus for reducing power consumption in a graphics processing device. The apparatus and method include a memory module monitoring device operative to receive a memory module status signal from memory modules. The memory module monitoring device is operative to generate a clock control signal in response to the memory module status signal. The apparatus and method further include a clock cycle reduction circuit coupled to the monitoring module. The clock cycle reduction circuit receives the clock control signal. The clock cycle reduction circuit generates a reduced cycle clock signal in response to the clock control signal such that the reduced cycle clock signal reduces power consumption in the graphics processing device.

6 Claims, 3 Drawing Sheets

APPARATUS AND METHOD FOR REDUCING POWER CONSUMPTION IN A GRAPHICS PROCESSING DEVICE

FIELD OF THE INVENTION

The present invention relates generally to the power saving techniques and more specifically to reducing power consumption in a computer processing environment.

BACKGROUND OF THE INVENTION

In existing processing systems, especially in mobile environments, power consumption requirements directly affect battery life. Furthermore, power consumption can drive processing capabilities and further drive processing speeds. In a typical processing environment, therefore, power consumption is an important factor to monitor and attempt to minimize. Minimized power consumption is sought not only during normal operations through efficient processing but also through the disablement of processing elements during idle times.

One common approach to power saving and power consumption reduction is the disabling of processing elements during idle times. In more common terms, this may be similar to a computer or other processing device entering a "sleep mode" or a "standby mode." To disable a particular processing element, such as a central processing unit or a graphics processor, clocks may be gated off completely. This typically entails gating off a clock frequency, such as setting the clock frequency to zero. In a typical graphics processing environment, a graphics engine may have multiple clocks for the 2D and 3D engines.

The current approach to power consumption is an all or nothing scenario for powering down. In this technique, a processor or a particular engine within the processor is either ON or OFF. Therefore, when a processing system enters a stall mode, the current approach does not allow for reduction in power consumption. Especially in an integrated chipset environment, processing system stalls may arise for reasons outside of the graphics engines, such as delays in a memory interface. During this scenario, this graphics processor is not in an idle or sleep mode, but rather is inactive awaiting further operations. Therefore, the graphics processor is unable to power down, but rather must maintain full power during the system stall time interval.

For example, if a graphics processing engine is coupled to one or more memory modules through a memory controller, the performance of the graphics processing engine may be dependent on the efficiency of data transfer through the memory controller. In an integrated chipset environment, a northbridge may further couple the memory controller to a central processing unit. The memory controller may further be coupled to an output display. Therefore, there exists the potential for processing delays at various processing levels, wherein the current power saving approach is unable to effectively remedy power consumption in view thereof.

In other words, the current power consumption reduction techniques include reducing power when the system is in an idle or sleep mode, but fails to account for power reduction during a stall mode. Therefore, there exists a need for applicable reduction of power consumption requirements for a graphics processing device during non-idle times.

DETAILED DESCRIPTION OF THE PREFERRED EMBODIMENTS

Briefly, the present invention includes a method and an apparatus for reducing power consumption in a graphics processing device. The apparatus and method include a memory module monitoring device operative to receive a memory module status signal from memory modules. The memory module monitoring device may be implemented in hardware, software or a combination thereof to receive the memory module status signals. The memory module status signals may be any suitable type of signal indicating the current status of memory modules, such as, but not limited to, if the memory module is in a stall operation. The memory module monitoring device is operative to generate a clock control signal in response to the memory module status signal. The clock control signal may be any suitable signal indicating whether to adjust a system clock cycle.

The apparatus and method further include a clock cycle reduction circuit coupled to the monitoring module. The clock cycle reduction circuit may be implemented in hardware, software or a combination thereof to receive the clock control signal and generate a reduced clock cycle signal in response to the clock control signal. Thereupon, the reduced clock cycle signal is provided to the graphics processing device and thereby reduces power consumption during a stall period.

Figure 1:
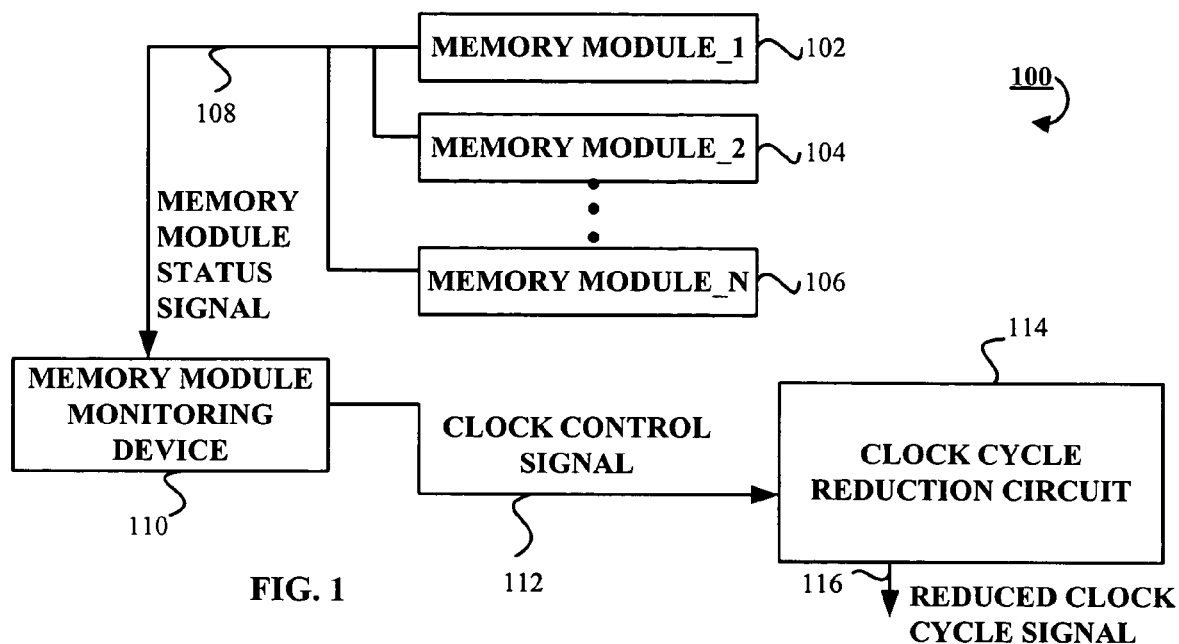
FIG. 1 illustrates an apparatus for reducing power consumption in a graphics processing device in accordance with one embodiment of the present invention.

More specifically, FIG. 1 illustrates an apparatus 100 for diffusing power consumption in accordance with one embodiment to the present invention. The apparatus 100 includes memory modules 102, 104 and 106. In the exemplary embodiment illustrated in FIG. 1 any suitable number of memory modules may be utilized, such as indicated by the subindexing numbering of memory module N 106. The memory module, such as 102, 104 and 106, may be any suitable type of memory device capable of the input and/or output of data therethrough.

The memory module status signal 108 is provided to a memory module monitoring device 110. In response to the memory module status signal 108, the memory module monitoring device 110 generates a clock control signal 112. A clock cycle reduction circuit 114 receives the clock control signal 112 from the memory module monitoring device 110.

The clock control signal 112 is generated in response to the memory module status signal 108 by the memory module monitoring device 110.

The clock cycle reduction circuit 114 generates a reduced clock cycle signal 116 in response to the clock control signal 112. In one embodiment, the reduced clock cycle signal 116 may be a specific pulse signal used to mask out clock cycles of the original clock signal, producing a slowed down clock.

Figure 2:
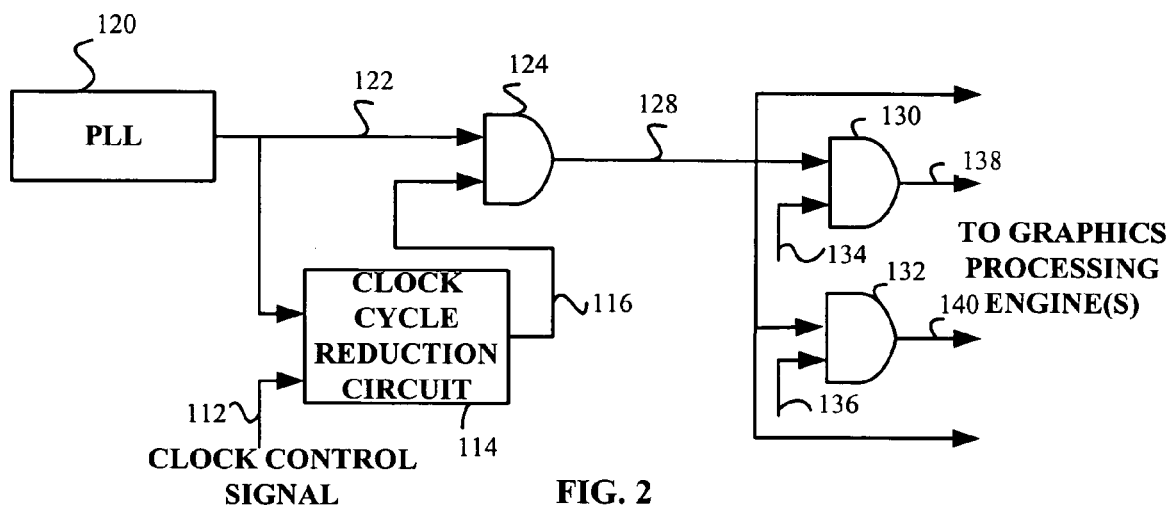
FIG. 2 illustrates a graphical representation of a portion of an apparatus for reducing power consumption in a graphics processing device in accordance with one embodiment of the present invention.

FIG. 2 illustrates a further aspect of one embodiment of an apparatus for reducing power consumption and a graphics processing device including a phase lock loop 120 operated to generate an original clock signal 122. The original clock signal 122 is provided to a gate 124 and also provides clock cycle reduction circuit 114, as discussed above with regards to FIG. 1. The clock cycle reduction circuit 114 also receives the clock control signal 112. As discussed above, the reduced clock cycle signal 116 is generated and provided to the gate 124.

Figure 3:
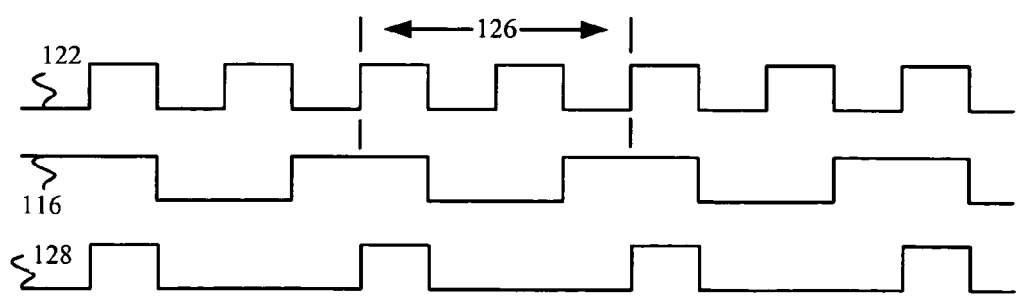
FIG. 3 illustrates a graphical representation of a representative timing sequence for a reduced clock cycle signal in accordance with exemplary embodiment of the present invention.

FIG. 3 illustrates a graphical representation of an exemplary embodiment of several timing signals, the original clock signal 122, the reduced clock cycle signal 116 and an output clock cycle signal 128. As illustrated, the original clock signal 122 has an exemplary frequency of two cycles in the defined interval 126 and the reduced clock cycle signal 116 and the output clock cycle signal 128 have a frequency of one during the same interval 126. Therefore, the output clock cycle signal 128, in the exemplary embodiment, is reduced in frequency by one half. The reduced clock cycle signal and output clock cycle signal may also be reduced in frequency by another amount, such as one third, one fourth, two thirds or three fourths.

Referring back to FIG. 2 if the gate 124 receives the reduced clock cycle signal 116, the gate 124 generates the output clock cycle signal 128 having a reduced frequency relative to the original clock signal 122 by using the reduced clock cycle signal 116 to mask out pulses of the original clock. As illustrated in FIG. 2, the output clock cycle signal 128 may then be provided to any suitable graphics processing engine (not specifically illustrated). In further embodiments, the output clock cycle signal 128 may be further adjusted using secondary gates 130 and 132 in relation to further adjustment signals 134 and 136 to generate output clock signals 138 and 140, respectively. For example, signals 134 and 136 may be zero signals indicating a sleep mode or standby mode for a particular graphics processing device, or may be any other suitable adjustment of the output cycle signals 138 and 140 as recognized by one having ordinary skill in the art.

Thereupon, the present invention may fully operate in conjunction with existing power reducing techniques based on standby or sleep mode processing states. Through the generation of clock control signal 112 in response to memory module status signal 108, the reduced clock cycle signal 116 allows for a reduced clock cycle signal for an eventual graphics processing engine to thereby reduce power consumption. As the clock cycle is reduced, processing functions are slowed down, thereby requiring less power and less power consumption during stall periods. As discussed below more specifically with regards to FIGS. 4 and 5, the present invention further includes determining when a stall condition exists and when to maintain the reduced clock cycle signal 116.

Figure 4:
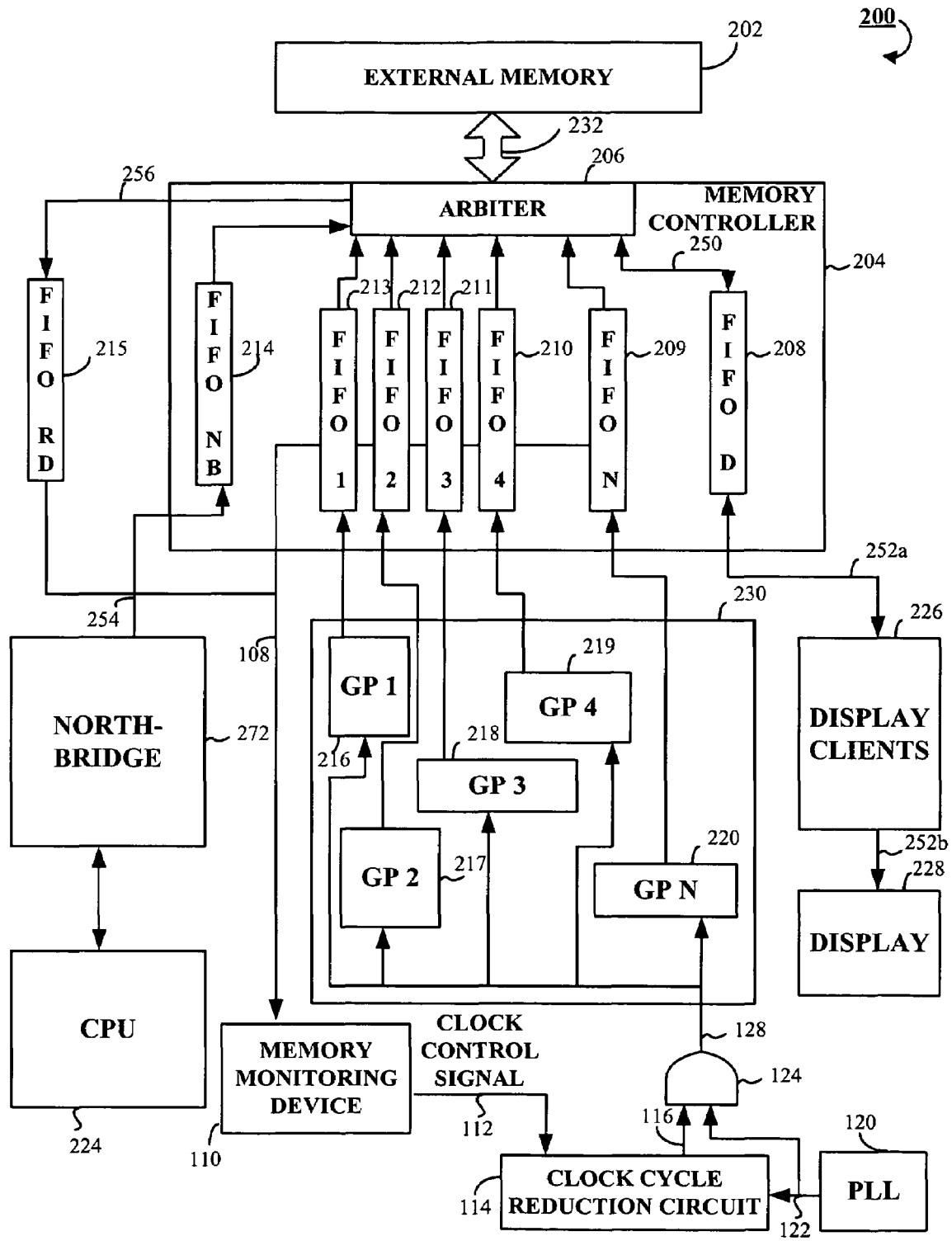
FIG. 4 illustrates an apparatus for reducing power consumption in a graphics processing device in accordance with another embodiment of the present invention.

FIG. 4 illustrates a processing system 200 having an external memory 202, a memory controller 204 with an arbiter 206, plurality of memories, such as first-in-first-out (FIFO) memories 208-215, a plurality of graphics processors 216-220, the memory module monitoring device 110 and the clock cycle reduction circuit 114. The system 200 further includes a northbridge module 272 coupled to a central processing unit (CPU) 224 and a display client module 226 coupled to an output display 228.

The external memory 202 may be any suitable memory, such as but not limited to system memory, any suitable external memory device such as a single memory, plurality of memory locations, shared memory, CD, DVD, ROM, RAM, EEPROM, optical storage, or any other non-volatile storage medium as recognized by one having ordinary skill in the art. The memory devices 208-215 are represented in the exemplary embodiment of FIG. 4 as being FIFO buffers, but as recognized by one having ordinary skill in the art, any suitable memory source may be utilized within the memory control 204.

The arbiter 206 may be implemented in hardware, software or a combination thereof for interfacing with the external memory 202 and providing for data transfer between the various FIFOS 208-215 and the external memory 202. It should be further noted that the graphics processing engines 216-220 are typically located within a graphics processing device 230, but may be disposed within one or more graphics processing devices or disposed across multiple processing elements having graphics processing engines thereon. Regardless of the specific designated location of graphics processing engines 216-220, the engines 216-220 are operative to receive the output clock cycle signal 128 from the clock cycle reduction circuit 114.

In normal operations, the memory controller 204 is in data communication with the external memory 202 across a data bus 232. During normal graphics processing operations, the graphics processing engines 216-220 provide data to the memories 210-213. In accordance with standard FIFO buffer operations, data is provided to the arbiter 206 such that the arbiter may control the information. For example, the arbiter 206 may provide output data 250 to the FIFO 208 such that display data 252A is provided to the display clients 226 and subsequent display data 252B is provided to the display 228. Furthermore, the arbiter 206 may offer interaction between the CPU 224 across the northbridge 272 and their receipt of data 254 by the northbridge FIFO 214 within the memory controller 204.

The arbiter 206 is further coupled to the read FIFO 215 to provide read data 256 which may be provided from any suitable location, such as the external memory 202. In one embodiment, the memories 209-213 and 215 generate the memory module status signal indicating whether any of the FIFOs are in a stall condition or in a wait condition. As recognized by one having ordinary skill in the art, one of the FIFOs may be in a stalled condition due to data overflow within the arbiter 206, data retrieval problems relative to the external memory 202, or any other suitable processing condition whereupon data is unavailable to be read directly out of the FIFOs 210-213 in a timely manner or written to the read FIFO 215. In one embodiment, the memory module status signal may be a zero signal indicating normal operations and a one signal indicating a stall condition.

Similar to the embodiment discussed above, once the monitoring module 110 receives the memory module status signal 108, the memory module monitoring device 110 is capable of generating the clock control signal 112. The control signal 112 is provided to the clock cycle reduction circuit whereupon the reduced clock cycle signal is provided to each of the graphics processing engines 216-220. In this embodiment, having a reduced clock cycle signal indicating the timing sequence for graphic processing engines 216-220, the graphics processing engines in a reduced processing speed thereby reducing overall power consumption during a stall mode.

Figure 5:
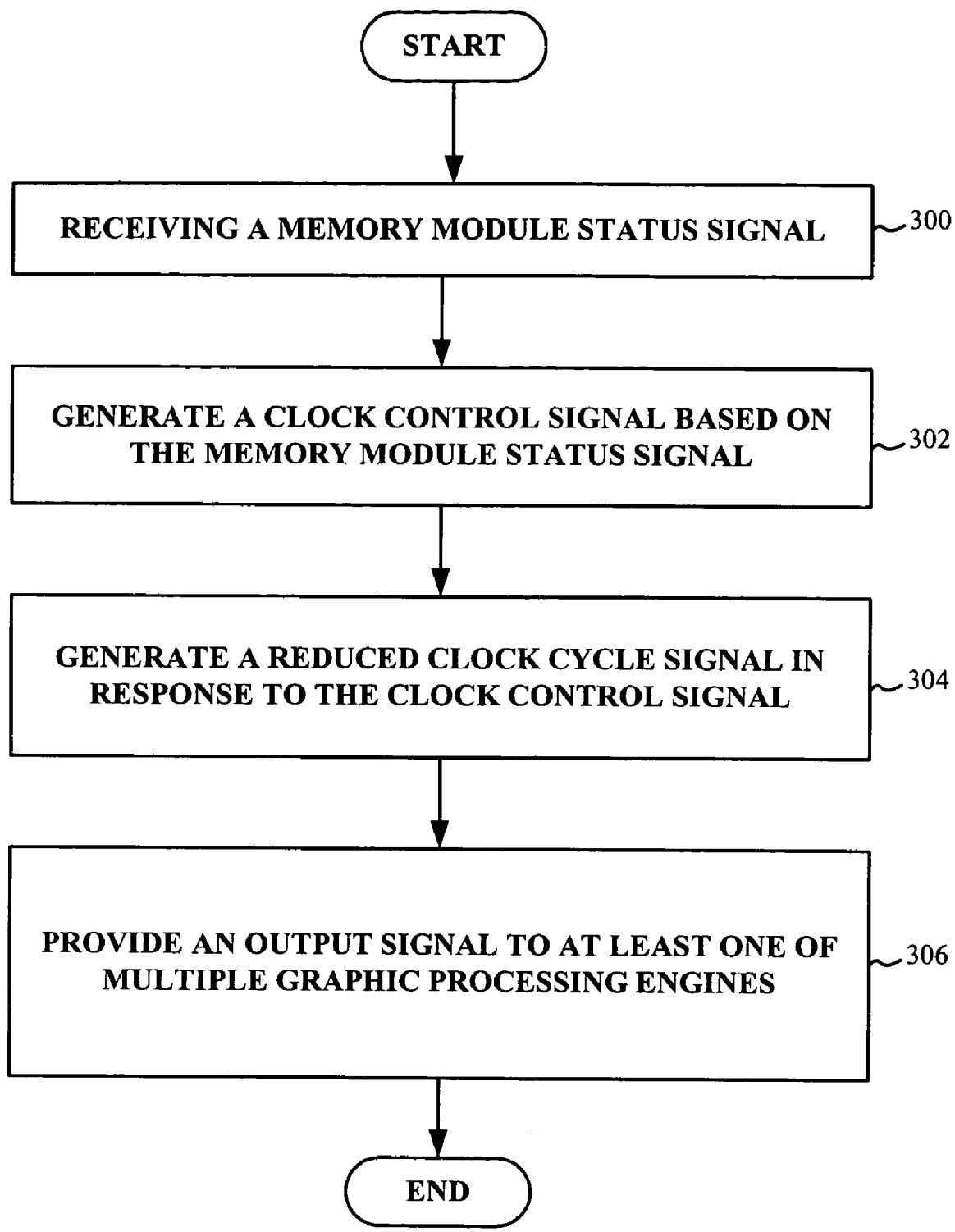
FIG. 5 illustrates the steps of a flowchart of a method for reducing power consumption in a graphics processing device in accordance with one embodiment of the present invention.

FIG. 5 illustrates the steps of a flowchart of method for reducing power consumption in a graphics processing device, in accordance with one embodiment with the present invention. The method begins by receiving a memory module status signal, step 300. As discussed above, the memory module status signal may be any signal indicating the status of a memory module, such as idle, active, full, waiting signal or any other suitable signal. Step 302 is to generate a clock signal based on the memory module status signal. The next step is to generate a clock control signal based on the memory module status signal, step 302. The clock control signal, such as the clock control signal 112 of FIG. 1, indicates if a condition exists for adjusting the power consumption of a graphics processing device.

Step 304 is to generate a reduced clock cycle signal in response to the clock control signal. In one embodiment, Step 304 may be performed by a clock cycle reduction circuit, such as the clock cycle reduction circuit of 114 of FIG. 1. Similarly, FIG. 3 illustrates one exemplary embodiment of a one half cycle reduced clock cycle signal 116. Step 306 is to provide the output signal to at least one of multiple graphics processing engines. In the exemplary embodiment of FIG. 4, graphics processing engines 216-220 receive the output clock cycle signal 128 from the logic gate 124. Thereupon, in one embodiment of the present invention, the method is complete.

In further embodiments, the present invention utilizes an original clock signal from the phase lock loop, such as the phase lock loop 120 of FIG. 2 and the original signal 122 illustrated in FIGS. 2 and 3. The reduced clock cycle signal may be generated based on the original clock signal from the phase lock loop such that an indication of the reduction of frequency may be achieved. For example, using the exemplary illustrations in FIG. 3, if the output signal 128 indicates a reduction cycle of one-half, the reduced clock cycle signal may be generated by deleting every other clock cycle of the original clock signal 122.

In another embodiment, a predetermined time interval may be utilized to determined if a particular stall condition exists. For example, using the exemplary embodiment of FIG. 4, the monitoring module 110 may receive the memory module status signal 108 indicating that a stall condition occurred in one of the memory devices, such as the FIFOS 209-213 and/or 215. The monitoring module may then read memory module status signal 108 for a predetermined time interval to see if the signal changes. In one exemplary embodiment, the predetermined number of clock cycles, such as but not limited to 16 clock cycles, may be used as the predetermined time interval. As recognized as one having ordinary skill in the art, any other suitable time interval may be utilized and adjusted to allow for efficient operation of the memory module monitoring device 110 relative to determining when a stall condition exists. Thereupon, in at least one embodiment if the memory module status signal indicates a stall condition, the present invention allows for the generation of the clock control signal 112.

As such, the present invention allows for the reduction of power consumption in the graphic processing device. Previous techniques required the system to be in a standby mode or idle state to completely power down a particular processing unit. To the active monitoring of the status of memory devices, the present invention allows for reducing power consumption during the time interval in which the graphics processing engines would be inactive due to associated memory devices, such as the FIFO buffers, being full or a rebuffer awaiting data from an external memory device. Thereupon, the present invention allows for the reduction of power consumption outside of the standby mode, rather allows for reduction during stall intervals thereby reducing overall power consumption requirements for a processing environment.

It should be understood that the implementation of other variations and modifications of the invention in its various aspects would be apparent to those ordinary skill in the art, if the invention is not limited by the specific embodiment described herein. For example, the graphics processing engine may be disposed on any level of processing environments such as on a signal processing device or across multiple devices operably coupled via a bus or any other suitable connecting means such that the various graphics processing engines are operative to receive the reduced clock cycle signal during a stall time interval. In another example, other operations may be utilized to reduce the clock frequency, including any suitable technique recognized by one having ordinary skill in the art. Therefore, it is contemplated to cover by the present invention, any and all modifications, variations or equivalents that fall within the spirit and the scope of the basic underlying principles disclosed and claimed herein.

What is claimed is:

1. An apparatus for reducing power consumption in a graphics processing device, the apparatus comprising:

a memory module monitoring device operative to receive a memory module status signal from at least one of a plurality of memory modules, wherein the memory module monitoring device generates a clock control signal in response to the memory module status signal;

a clock cycle reduction circuit operatively coupled to the memory module monitoring device and operative to receive the clock control signal such that the clock cycle reduction circuit generates a reduced clock cycle signal in response to the clock control signal such that the reduced clock cycle signal reduces power consumption in the graphics processing device;

a phase locked loop operatively coupled to the clock cycle reduction circuit such that the phase locked loop generates an original clock signal and the clock cycle reduction circuit reduces clock cycles of the original clock signal to generate the reduced clock cycle signal;

wherein the memory module monitoring device reads the memory module status signal for a first predetermined number of intervals prior to generating a clock control signal; and wherein the clock cycle reduction circuit generates the reduced clock cycle signal for a second predetermined number of clock cycles prior to reading a second clock control signal from the memory module monitoring device.

2. The apparatus of claim 1 wherein the reduced clock cycle signal has a cycle reduced by at least one of the following: one half, one third, one fourth, two thirds and three fourths.

3. A method for reducing power consumption in a graphics processing device, the method comprising:

receiving a memory module status signal;

based on the memory module status signal, generating a clock control signal;

in response to the clock control signal, generating a reduced clock cycle signal;

providing an output clock cycle signal based on the reduced clock cycle signal to at least one of a plurality of graphics processing engines in a graphics processing device to reduce power consumption of the graphics processing device; and wherein generating the clock control signal further comprises:

determining if the memory module status signal indicates a stall condition in the graphics processing device;

if the stall condition is determined, waiting a predetermined time interval;

after the time interval, determining if the memory module status signal still indicates a stall condition in the graphics processing device; and if the stall condition is indicated for the predetermined time interval, generate the clock control signal.

4. An apparatus for reducing power consumption in a graphics processing device, the apparatus comprising:

a memory module monitoring device operative to receive a memory module status signal from at least one of a plurality of memory modules, wherein the memory module monitoring device generates a clock control signal in response to the memory module status signal;

a phase locked loop operatively coupled to a clock cycle reduction circuit such that the phase locked loop generates an original clock signal and the clock cycle reduction circuit reduces clock cycles of the original clock signal to generate a reduced clock cycle signal;

a clock cycle reduction circuit operatively coupled to the memory module monitoring device and operative to receive the clock control signal such that the clock cycle reduction circuit generates a reduced clock cycle signal in response to the clock control signal such that the reduced clock cycle signal reduces power consumption in the graphics processing device;

a plurality of graphics processing engines operatively coupled to the clock cycle reduction circuit such that the graphics processing engines are operative to receive the reduced clock cycle signal;

the plurality of memory modules disposed within a memory controller, wherein at least one of the plurality of memory modules is operatively coupled to at least one of the plurality of graphics processing engines, such that each of the graphics processing engines writes request data to corresponding memory modules within the memory controller.

5. An apparatus for reducing power consumption in a graphics processing device, the apparatus comprising:

a memory module monitoring device operative to receive a memory module status signal from at least one of a plurality of memory modules, wherein the memory module monitoring device generates a clock control signal in response to the memory module status signal; and a clock cycle reduction circuit operably coupled to the memory module monitoring device and operative to receive to the clock control signal such that the clock signal reduction circuit generates a reduced clock cycle signal in response to the clock control signal and provides an output clock signal based on the reduced clock signal to at least one of a plurality of graphics processing engines in a graphics processing device to reduce power consumption of the graphics processing device and wherein the clock cycle reduction circuit:

determines if the memory module status signal indicates a stall condition in the graphics processing device;

if a stall condition is determined, waits a predetermined time interval;

after the time interval, determines if the memory module status signal still indicates a stall condition in the graphics processing device; and if the stall condition is indicated for the predetermined time interval, generates the clock control signal.

6. An apparatus for reducing power consumption in a graphics processing device, the apparatus comprising:

a memory module monitoring device operative to receive a memory module status signal from at least one of a plurality of memory modules, wherein the memory module monitoring device generates a clock control signal in response to the memory module status signal; and a clock cycle reduction circuit operably coupled to the memory module monitoring device and operative to receive to the clock control signal such that the clock signal reduction circuit generates a reduced clock cycle signal in response to the clock control signal and provides an output clock signal based on the reduced clock signal to at least one of a plurality of graphics processing engines in a graphics processing device to reduce power consumption of the graphics processing device and wherein the clock cycle reduction circuit, when a stall condition exists, waits a time interval and, after the time interval has elapsed and a stall condition still exists, generates the clock control signal.

* * * * *